(12) United States Patent
Walker et al.

(10) Patent No.: US 12,413,445 B2
(45) Date of Patent: Sep. 9, 2025

(54) COMMUNICATION CONTROL DEVICE AND TRANSMIT/RECEIVE DEVICE FOR A SUBSCRIBER STATION OF A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Steffen Walker, Reutlingen (DE);
Arthur Mutter, Neuhausen (DE);
Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 17/874,507

(22) Filed: Jul. 27, 2022

(65) Prior Publication Data

US 2023/0046824 A1 Feb. 16, 2023

(30) Foreign Application Priority Data

Aug. 12, 2021 (DE) ...................... 10 2021 208 841.4

(51) Int. Cl.
*H04L 12/40* (2006.01)
(52) U.S. Cl.
CPC .. *H04L 12/40013* (2013.01); *H04L 12/40078* (2013.01)
(58) Field of Classification Search
CPC ................................................ H04L 12/40013
See application file for complete search history.

(56) References Cited

U.S. PATENT DOCUMENTS

| | | | |
|---|---|---|---|
| 2010/0329247 A1* | 12/2010 | Kennedy | H04L 25/49 375/259 |
| 2015/0092545 A1* | 4/2015 | Katar | H04L 1/0078 370/230 |
| 2018/0139072 A1 | 5/2018 | Komano et al. | |
| 2022/0046114 A1* | 2/2022 | Entelis | H04L 12/40 |
| 2022/0191059 A1* | 6/2022 | Rennig | H04L 12/40169 |

* cited by examiner

*Primary Examiner* — Jason E Mattis
(74) *Attorney, Agent, or Firm* — NORTON ROSE FULBRIGHT US LLP (57) ABSTRACT

A communication control device. The communication control device has a communication control module for generating a transmit signal for controlling communication of the subscriber station with other subscriber station(s) of the bus system which uses at least one first communication phase and one second communication phase for exchanging messages between subscriber stations of the bus system, and an interface module for encoding the transmit signal in at least one part of the second communication phase of a message into an encoded transmit signal, and for inserting additional data into at least one symbol of the encoded transmit signal. The interface module is configured to insert the additional data into the encoded transmit signal as at least one symbol of the encoded transmit signal serially with the information of the symbol of the transmit signal. The symbol duration of the transmit signal and of the encoded transmit signal is identical.

17 Claims, 6 Drawing Sheets

COMMUNICATION CONTROL DEVICE AND TRANSMIT/RECEIVE DEVICE FOR A SUBSCRIBER STATION OF A SERIAL BUS SYSTEM AND METHOD FOR COMMUNICATION IN A SERIAL BUS SYSTEM

CROSS REFERENCE

The present application claims the benefit under 35 U.S.C. 119 of German Patent Application No. DE 10 2021 208 841.4 filed on Aug. 12, 2021, which is expressly incorporated herein by reference in its entirety.

FIELD

The present invention relates to a communication control device and to a transmit/receive device for a subscriber station of a serial bus system and to a method for communication in a serial bus system operating at a high data rate, such as for example CAN XL.

BACKGROUND INFORMATION

Serial bus systems are used for message or data transfer in engineering systems in which sensors and controllers are used. The serial bus system enables communication between the sensors and controllers of the engineering system. Such an engineering system is for example a vehicle or an industrial production plant or the like.

There are various standards and data transfer protocols for data transfer in the bus system. A bus system in which data are transferred as messages using CAN FD to standard ISO 11898-1:2015 as the CAN protocol specification is frequently used for communication between sensors and controllers, for example in vehicles. The messages are transferred between the bus subscribers of the bus system, such as a sensor, controller, transducer, etc. In CAN FD, transfer on the bus alternates between a slow operating mode in a first communication phase (arbitration phase) and a fast operating mode in a second communication phase (data phase). A data transfer rate of greater than 1 Mbit per second (1 Mbps) in the second communication phase is possible in a CAN FD bus system. Most manufacturers use CAN FD in the vehicle in the first step with an arbitration bit rate of 500 kbit/s and a data bit rate of 2 Mbit/s.

In order to enable still higher data rates in the second communication phase, there are successor bus systems to CAN FD, such as for example CAN SIC and CAN XL. According to standard CiA601-4, a data rate of approximately 5 to 8 Mbit/s can be achieved in the second communication phase with CAN SIC. A data rate in the second communication phase of >10 Mbit/s is required in CAN XL, the standard (CiA610-3) for this system currently being defined by the organization CAN in Automation (CiA). In addition to pure data transfer via the CAN bus, CAN XL is also intended to support other functions, such as functional safety, data security and quality of service (QoS). These are fundamental characteristics which are required in self-driving vehicles.

A serial signal for a message to be transmitted to the bus is generated in a subscriber station of the bus system using a communication control device which may include a protocol controller. The serial signal is forwarded to a transmit/receive device, which may also be denoted a transceiver. The transmit/receive device generates from the serial signal at least one signal which is to be transferred on the bus of the bus system to other subscriber stations in the bus system. Communication between the communication control device and the transmit/receive device of a subscriber station is necessary to ensure a correct changeover between the two different communication phases of CAN XL.

At present, an additional terminal is required on both devices for such internal communication between the communication control device and the transmit/receive device which is not to be transmitted to the bus. However, this results in high costs, for example on the printed circuit board and in the microcontroller of the associated subscriber station. In addition, transfer of the other data may possibly lead to a reduction in the transferable data rate in the bus system.

SUMMARY

It is an object of the present invention to provide a communication control device and a transmit/receive device for a subscriber station of a serial bus system and a method for communication in a serial bus system which solve the above-stated problems. In particular, an object is to provide a communication control device and a transmit/receive device for a subscriber station of a serial bus system and a method for communication in a serial bus system, in which communication between the communication control device and the transmit/receive device of a subscriber station can be achieved at low cost and with high error robustness and a high data rate in the bus system.

The object may be achieved by a communication control device for a subscriber station of a serial bus system having the features of the present invention. In accordance with an example embodiment of the present invention, the communication control device has a communication control module for generating a transmit signal for controlling communication of the subscriber station with at least one other subscriber station of the bus system, wherein the bus system is configured to use at least one first communication phase and one second communication phase for exchanging messages between subscriber stations of the bus system, and an interface module for encoding the transmit signal in at least one part of the second communication phase of a message into an encoded transmit signal, and for inserting additional data into at least one symbol of the encoded transmit signal, wherein the interface module is configured to insert the additional data into the encoded transmit signal as at least one symbol of the encoded transmit signal serially with the information of the symbol of the transmit signal, and wherein the symbol duration of the transmit signal and of the encoded transmit signal is identical.

Using the communication control device, it is possible, without additional costly terminals between the communication control device and the transmit/receive device, to transfer additional data between the two devices. The communication control device is in this case configured to integrate the additional data into the transmit signal which is transmitted by the communication control device to the transmit/receive device for transmission to the bus. Nevertheless, integrating these additional data does not reduce the previous rapid data transfer in the serial bus system.

The communication control device thus allows more data to be transferred between the communication control device and the transmit/receive device, despite the transfer frequency remaining the same, as for example defined in standard CiA610-3.

Furthermore, using the communication control device, it is possible to retain arbitration as from CAN in one of the communication phases and nevertheless to achieve a further considerable increase in transfer rate over CAN or CAN FD.

This can be achieved by using two communication phases with different bit rates and making the beginning of the second communication phase, in which the useful data are transferred at a higher bit rate than during arbitration, reliably identifiable for the transmit/receive device. The transmit/receive device can therefore reliably change over from a first communication phase into the second communication phase.

As a consequence, a high bit rate and thus speed of transfer from transmitter to receiver is achievable. At the same time, however, high error robustness is ensured. This assists with achieving a net data rate of at least 10 Mbps.

The method carried out by the communication control device may also be used when the bus system also includes at least one CAN subscriber station and/or at least one CAN FD subscriber station which transmit messages according to the CAN protocol and/or CAN FD protocol.

Advantageous further example configurations of the communication control device are disclosed herein.

According to one development of the present invention, the interface module is configured to carry out pulse-width modulation for encoding the transmit signal in at least one part of the second communication phase of the message.

The interface module is possibly configured to subdivide the symbol duration of the transmit signal for the encoded transmit signal into n symbols for a first symbol of the transmit signal and into n symbols for a second symbol of the transmit signal, wherein n is a natural number greater than or equal to 1. The interface module may in this case be configured to insert the information of the symbol of the transmit signal into the first or last symbol of the 2*n symbols of the symbol duration of the encoded transmit signal. The interface module may alternatively be configured to insert the additional data between the first and last symbols of the 2*n symbols of the symbol duration of the encoded transmit signal.

The communication control module is possibly configured to generate the transmit signal in the first communication phase of the message with symbols with a first bit time which is at least a factor of 10 greater than a second bit time of symbols which the communication control module generates in the transmit signal in the second communication phase of the message.

The above-stated object may be additionally achieved by a transmit/receive device for a subscriber station of a serial bus system having the features of the present invention. In accordance with an example embodiment of the present invention, the transmit/receive device has a transmit module for transmitting a transmit signal to a bus of the bus system, wherein the bus system is configured to use at least one first communication phase and one second communication phase for exchanging messages between subscriber stations of the bus system, an interface module for decoding the transmit signal in at least one part of the second communication phase of a message into a decoded transmit signal, and for extracting additional data from at least one symbol of the encoded transmit signal, and wherein the interface module is configured to extract the additional data from at least one symbol of the encoded transmit signal, which data have been inserted into the encoded transmit signal serially with the information of the symbol of the transmit signal, and wherein the symbol duration of the transmit signal and of the decoded transmit signal is identical.

According to one development of the present invention, the interface module is configured to carry out decoding of pulse-width modulation of the transmit signal in the at least one part of the second communication phase of the message.

In accordance with an example embodiment of the present invention, in the transmit/receive device, the interface module may be configured to subdivide the symbol duration of the encoded transmit signal into n symbols for a first symbol of the encoded transmit signal and into n symbols for a second symbol of the encoded transmit signal, wherein n is a natural number greater than or equal to 1. The interface module is in this case configured to extract the information of the symbol of the transmit signal from the first or last symbol of the 2*n symbols of the symbol duration of the encoded transmit signal. The interface module is alternatively configured to extract the additional data between the first and last symbols of the 2*n symbols of the symbol duration of the encoded transmit signal.

The transmit module may be configured to transmit the transmit signal to the bus as a differential signal.

According to one option of the present invention, the transmit module is configured to generate the transmit signal in the first communication phase of the message and transmit it to the bus with a different physical layer than in the second communication phase of the message.

In the above-described devices, the additional data may include at least one form of data of the following data, namely data for signaling to the transmit/receive device the operating mode into which the transmit/receive device has to switch its operating mode for the following communication phase, data for configuration of the transmit/receive device, data with a request to the transmit/receive device, data for signaling to the transmit/receive device the differential voltage with which the transmit/receive device is to operate for the bus, data for programming or flashing devices, data with a trigger for a predetermined wake-up pattern for a predetermined subscriber station of the bus system.

It is possible for the first communication phase of the message to be provided in order to negotiate which of the subscriber stations of the bus system will receive at least temporarily exclusive, collision-free access to the bus in the following second communication phase.

The above-described communication control device and the above-described transmit/receive device may be part of a subscriber station of a bus system which additionally comprises a bus and at least two subscriber stations which are connected together via the bus in such a manner that they can communicate serially with each other. A least one of the at least two subscriber stations in this case has an above-described communication control device and an above-described transmit/receive device.

The above-stated object may be additionally achieved by a method for communication in a serial bus system in accordance with the present invention. In accordance with an example embodiment of the present invention, the method is carried out with a subscriber station for a bus system, in which at least one first communication phase and one second communication phase are used for exchanging messages between subscriber stations of the bus system, and wherein the method has the steps of generating, using a communication control module, a transmit signal for controlling communication of the subscriber station with at least one other subscriber station of the bus system, encoding, using an interface module, the transmit signal in at least one part of the second communication phase of a message into an encoded transmit signal, and inserting, using the interface module, additional data into at least one symbol of the encoded transmit signal, wherein the interface module inserts the additional data into the encoded transmit signal as at least one symbol of the encoded transmit signal serially with the information of the symbol of the transmit signal, and wherein the symbol duration of the transmit signal and of the encoded transmit signal is identical.

The method offers the same advantages as are stated above in relation to the communication control device and/or the transmit/receive device.

Further possible implementations of the present invention also include combinations which are not explicitly mentioned of features or embodiments as described above or hereinafter with regard to the exemplary embodiments. A person skilled in the art will in this case also add individual aspects as improvements or additions to the respective basic form of the present invention.

BRIEF DESCRIPTION OF THE DRAWINGS

The present invention is described in greater detail below by way of exemplary embodiments and with reference to the figures.

Unless otherwise stated, in the figures identical or functionally identical elements are provided with the same reference signs.

DETAILED DESCRIPTION OF EXAMPLE EMBODIMENTS

Figure 1:
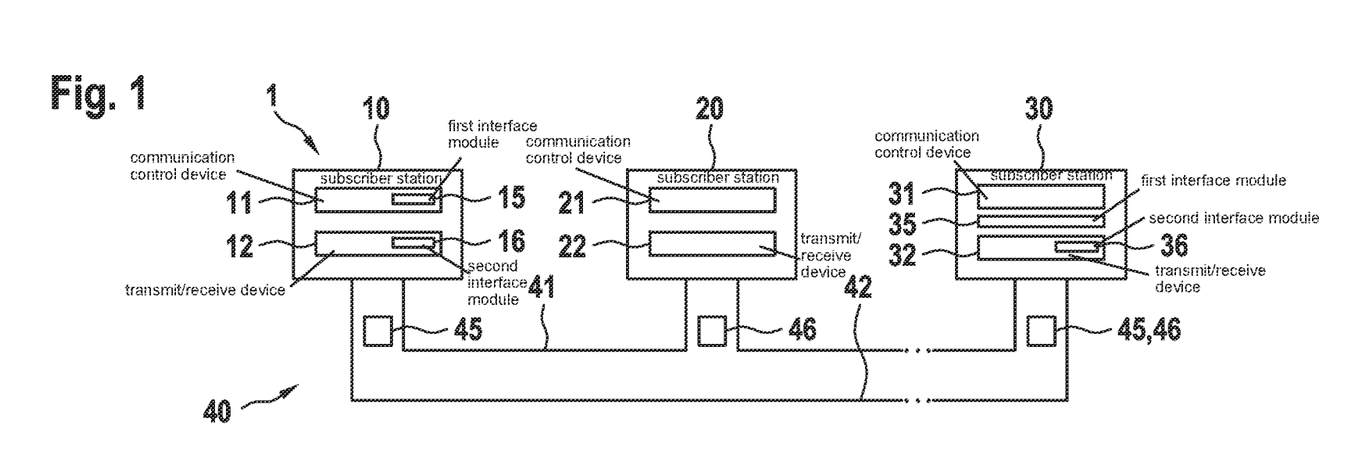
FIG. 1 shows a simplified block diagram of a bus system according to a first exemplary embodiment of the present invention.

FIG. 1 shows by way of example a bus system 1 which is in particular fundamentally configured for a CAN bus system, a CAN FD bus system, a CAN XL bus system, and/or modifications thereof, as described below. The bus system 1 may be used in a vehicle, in particular a motor vehicle, an aircraft, etc., or in a hospital etc.

In FIG. 1, the bus system 1 has a plurality of subscriber stations 10, 20, 30, which are in each case connected to a bus 40 with a first bus wire 41 and a second bus wire 42. The bus wires 41, 42 may also be denoted CAN_H and CAN_L and serve for electrical signal transfer after injection of the dominant level or generation of recessive levels for a signal in the transmit state. Messages 45, 46 in the form of signals can be serially transferred between the individual subscriber stations 10, 20, 30 via the bus 40. The subscriber stations 10, 20, 30 are for example control devices, sensors, display devices, etc. of a motor vehicle.

As FIG. 1 shows, the subscriber station 10 has a communication control device 11, a transmit/receive device 12, a first interface module 15 and a second interface module 16. In contrast, subscriber station 20 has a communication control device 21 and a transmit/receive device 22. Subscriber station 30 has a communication control device 31, a transmit/receive device 32, a first interface module 35 and a second interface module 36. The transmit/receive devices 12, 22, 32 of subscriber stations 10, 20, 30 are in each case directly connected to the bus 40, even if this is not illustrated in FIG. 1.

In each subscriber station 10, 20, 30, the messages 45, 46 are encoded bit-wise in the form of frames via a TXD line and an RXD line between the respective communication control device 11, 21, 31 and the associated transmit/receive device 12, 22, 32. This is described more precisely below.

The communication control devices 11, 21, 31 in each case serve to control communication of the respective subscriber station 10, 20, 30 via the bus 40 with at least one other subscriber station of subscriber stations 10, 20, 30 which are connected to the bus 40.

The communication control devices 11, 31 create and read first messages 45 which are, for example, modified CAN messages 45 and are below also denoted CAN XL messages 45. The CAN XL messages 45 are in this case structured on the basis of the CAN XL format, which is described in greater detail in relation to FIG. 2. The communication control devices 11, 31 may additionally be embodied in order, as required, to provide a CAN XL message 45 or a CAN FD message 46 for the transmit/receive devices 12, 32 or to receive it therefrom. The communication control devices 11, 31 thus create and read a first message 45 or second message 46, wherein the first and second messages 45, 46 differ with regard to their data transfer standard, namely in this case CAN XL or CAN FD.

The communication control device 21 may be embodied as a conventional CAN controller according to ISO 11898-1:2015, in particular in the manner of a CAN FD-tolerant classical CAN controller or a CAN FD controller. The communication control device 21 creates and reads second messages 46, for example classical CAN messages or CAN FD messages 46. The CAN FD messages 46 may comprise a number from 0 up to 64 data bytes which are additionally transferred at a distinctly higher data rate than a classical CAN message. In the latter case, the communication control device 21 is embodied as a conventional CAN FD controller.

Apart from the differences described more precisely below, the transmit/receive devices 12, 32 can be embodied as a CAN XL transceiver and/or CAN SIC transceiver. The transmit/receive devices 12, 32 can additionally or alternatively be embodied as a conventional CAN FD transceiver. The transmit/receive device 22 can be embodied as a conventional CAN transceiver or CAN FD transceiver.

In order to transmit messages 45, 47 using CAN XL and/or CAN SIC, tried and trusted characteristics are adopted which are responsible for the robustness and user friendliness of CAN and CAN FD, in particular a frame structure with identifier and arbitration using the conventional CSMA/CR method. The CSMA/CR method means that there must be "recessive" states on the bus 40 which can be overwritten by other subscriber stations 10, 20, 30 with dominant levels or dominant states on the bus 40.

Using the two subscriber stations 10, 30, it is possible to form and then transfer messages 45 with the CAN XL format or CAN FD format and to receive such messages 45 with CAN FD transceivers and/or CAN SIC transceivers and/or CAN XL transceivers.

Figure 2:
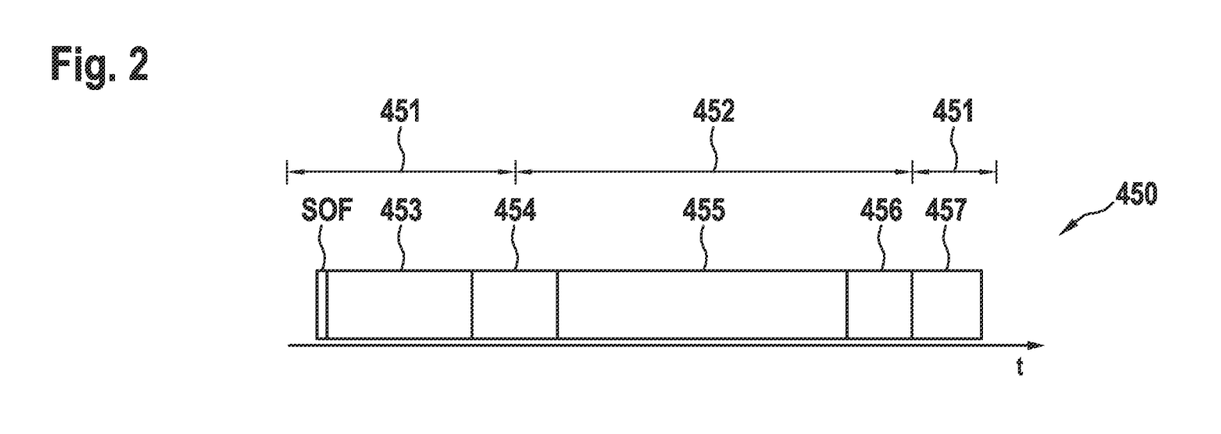
FIG. 2 shows a diagram illustrating the structure of messages which can be transmitted by subscriber stations of the bus system according to the first exemplary embodiment of the present invention.

FIG. 2 shows, for the message 45, a frame 450, in particular a CAN XL frame, as is provided by the communication control device 11 for the transmit/receive device 12 for transmission to the bus 40. The communication control device 11 in this case creates the frame 450 in the present exemplary embodiment as compatible with CAN FD. The frame 450 is alternatively compatible with CAN SIC.

According to FIG. 2, the frame 450 for CAN communication on the bus 40 is subdivided into different communication phases 451, 452, namely an arbitration phase 451 (first communication phase) and a data phase 452 (second communication phase). The frame 450 has, after a start bit SOF, an arbitration field 453, a control field 454, a data field 455, a checksum field 456, and an end of frame field 457.

In the arbitration phase 451, the subscriber stations 10, 20, 30 negotiate bit-by-bit, with the assistance of an identifier (ID) for example using bits ID28 to ID18 in the arbitration field 453, which subscriber station 10, 20, 30 wishes to send the highest priority message 45, 46 and therefore receives exclusive access to the bus 40 of the bus system 1 for the next time for transmission in the subsequent data phase 452. The arbitration phase 451 uses a physical layer as in CAN and CAN-FD. The physical layer corresponds to the bit transfer layer or layer 1 of the conventional OSI (Open Systems Interconnection) model.

One important point during phase 451 is that the conventional CSMA/CR method is used which permits simultaneous access of the subscriber stations 10, 20, 30 to the bus 40 without the higher priority message 45, 46 being destroyed. As a result, further bus subscriber stations 10, 20, 30 can relatively straightforwardly be added to the bus system 1, which is highly advantageous.

The CSMA/CR method means that there must be "recessive" states on the bus 40 which can be overwritten by other subscriber stations 10, 20, 30 with dominant levels or dominant states on the bus 40. In the recessive state, high-resistance conditions prevail at the individual subscriber stations 10, 20, 30, which, in combination with bus switching parasitics, results in extended time constants. At present, this leads to a limitation of the maximum bit rate of today's CAN FD physical layer to approximately 2 megabits per second in real vehicle use.

In addition to part of the control field 454, the useful data of the CAN XL frame 450 or the message 45 from the data field 455 and the checksum field 456 are transmitted in the data phase 452. The checksum field 456 may include a checksum regarding the data of the data phase 452 including stuff bits which are inserted by the transmitter of the message 45 after in each case a predetermined number of identical bits, in particular 10 identical bits, as an inverted bit. At the end of the data phase 452, operation is switched back to the arbitration phase 451.

At least one acknowledge bit may be present in an end field in the end of frame phase 457. A sequence of 11 identical bits may moreover be present which indicate the end of the CAN XL frame 450. The at least one acknowledge bit can communicate whether or not a receiver has found an error in the received CAN XL frame 450 or message 45.

A transmitter of the message 45 only begins transmitting bits of the data phase 452 to the bus 40 once the subscriber station 10 has won the arbitration as the transmitter and the subscriber station 10 as transmitter thus has exclusive transmission access to the bus 40 of the bus system 1.

In the arbitration phase 451 as the first communication phase, subscriber stations 10, 30 thus in part, in particular up to (and including) the FDF bit, make use of a format from CAN/CAN FD according to ISO 11898-1:2015. However, in comparison with CAN or CAN FD, an increase in the net data transfer rate, in particular up to over 10 megabits per second, is possible in the data phase 452 as the second communication phase. Moreover, the volume of useful data per frame can be raised, in particular to approximately 2 kbytes or any other desired value.

Figure 3:
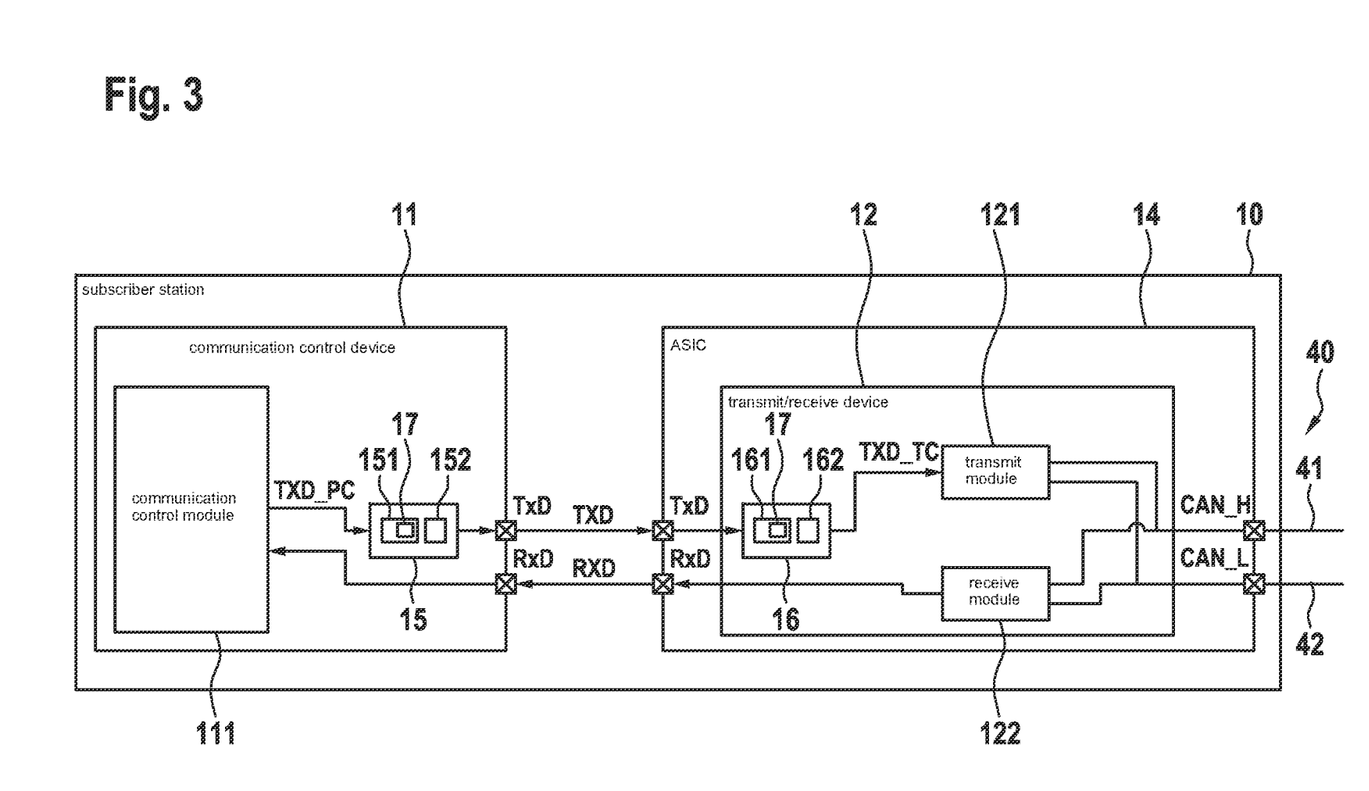
FIG. 3 shows a simplified schematic block diagram of a subscriber station of the bus system according to the first exemplary embodiment of the present invention.

FIG. 3 shows the basic structure of the subscriber station 10 with the communication control device 11, the transmit/receive device 12, a system ASIC 14 and the interface modules 15, 16. The interface modules 15, 16 process encoding for changeover of the operating mode of the transmit/receive device 12 between operating modes of the two communication phases 451, 452. Furthermore, additional data 17 can be transmitted from the device 11 to the device 12 with the assistance of the interface modules 15, 16, as will be described more precisely below.

The communication control device 11 is configured as a microcontroller or includes a microcontroller. The communication control device 11 processes signals of any desired application, for example a control device for a motor, a safety system for a machine or a vehicle, or other applications. The microcontroller is alternatively or additionally configured to acquire at least one physical quantity, such as temperature, pressure or other physical quantities, and to evaluate and/or forward the resultant information via the bus 40 to another subscriber station 10, 20, 30 of the bus system 1 of FIG. 1.

In addition to the interface module 15, the communication control device 11 has a communication control module 111. The communication control module 111 is a protocol controller which implements a communication protocol, for example the CAN protocol, in particular the protocol for CAN XL or CAN FD. The communication control module 111 is configured to output a signal TXD_PC to the first interface module 15. The first interface module 15 has a memory block 151, in which for example the data 17 are storable. The first interface module 15 additionally has an encoding block 152 which generates a transmit signal TXD from the signal TXD_PC. In the data phase 452, the encoding block 152 carries out pulse-width modulation (PWM) of the signal TXD_PC and so generates a pulse-width-modulated transmit signal TXD for the data phase 452. Additionally, in the data phase 452 the encoding block 152 can encode the additional data 17 into the signal TXD_PC in order to generate the transmit signal TXD. This is described more precisely below. The data 17 may be generated for example by the communication control device 11 and/or the communication control module 111 and stored in the memory block 151.

In contrast, in the arbitration phase 451, the encoding block 152 does not carry out any encoding of the signal TXD_PC. In the arbitration phase 451, signal TXD_TC=transmit signal TXD therefore applies.

The first interface module 15 outputs the transmit signal TXD to the terminal TxD of the device 11. The communication control module 111 is additionally configured to receive a signal RXD from the terminal RxD of the device 11.

In the example of FIG. 3, the transmit/receive device 12 is integrated into the system ASIC 14 (ASIC=application-specific integrated circuit). Alternatively, however, the transmit/receive device 12 may be a separate device. The system ASIC 14 may alternatively be a system basis chip (SBC) on which a plurality of functions required for an electronics assembly of the subscriber station 10 are combined. The system ASIC 14 may inter alia include the transmit/receive device 12 and a power supply device (not shown) which supplies the transmit/receive device 12 with electrical energy. The power supply device usually supplies a voltage CAN Supply of 5 V. If required, however, the power supply device can supply another voltage with a different value and/or be configured as a power source. The transmit/receive device 12 additionally has a transmit module 121 and a receive module 122.

The first interface module 15 of the communication control device 11 is of symmetrical construction to the second interface module 16 of the transmit/receive device 12. The first interface module 15 may also be denoted PC interface module 15. The second interface module 16 may also be denoted TC interface module 16. The first interface module 15 transmits the transmit signal TXD from the terminal TxD of the communication control device 11 to the terminal TxD of the transmit/receive device 12. The transmit signal TXD is thus transferred between the interface modules 15, 16.

The interface module 16 has a memory block 161 and a decoding block 162. In the data phase 452, the decoding block 162 carries out decoding of the signal TXD in order to eliminate the pulse-width modulation. In addition, the decoding block 162 extracts the data 17 from the transmit signal TXD. The decoding block 162 can store the data 17 in particular in the memory block 161. The data 17 are usable in the transmit/receive device 12 and/or the system ASIC 14. The decoding block 162 thus outputs the pulse-width-demodulated transmit signal TXD_TC to the transmit module 121. The transmit signal TXD_TC is processed by the transmit module 121 for transmission to the bus 40.

In contrast, in the arbitration phase 451, the decoding block 152 does not have to carry out any decoding of pulse-width modulation of the signal TXD. In principle, however, the signal TXD can be NRZ-encoded. In this case, NRZ=non-return-to-zero=encoding of the signal onto two different conduction states, usually voltage states, with constant levels during a symbol. In the arbitration phase 451, transmit signal TXD=signal TXD_TC therefore applies.

The subscriber station 30 is of similar construction, as shown in FIG. 3, except that module 35 is not integrated into the communication control device 31 but instead provided separately from the communication control device 31 and the transmit/receive device 32. Subscriber station 30 and module 35 are therefore not separately described. The functions described below of the first interface module 15 are identically present in the first interface module 35. The functions described below of the second interface module 16 are identically present in the second interface module 36.

It is alternatively or additionally possible for the module 16 not to be integrated into the transmit/receive device 12 but instead to be provided separately from the communication control device 11 and the transmit/receive device 12.

Figure 4:
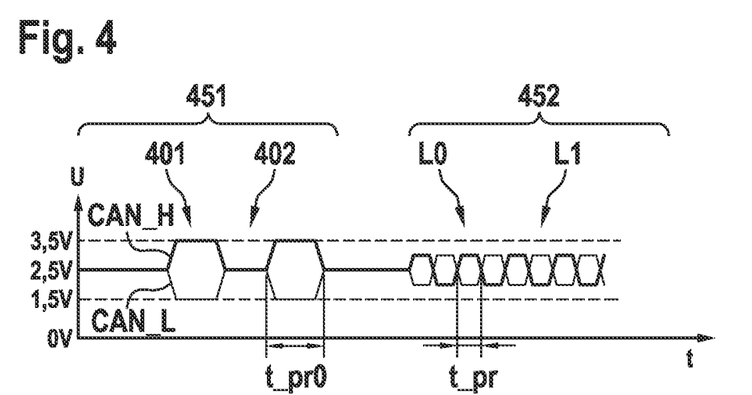
FIG. 4 to FIG. 7 each shows an example of a time plot respectively of signals or states or symbols at the subscriber station of FIG. 3, when the subscriber station is a transmitter of a message transmitted via a bus of the bus system.

As shown in FIG. 3, the transmit/receive device 12 is connected to the bus 40, or more precisely its first bus wire 41 for CAN_H and its second bus wire 42 for CAN_L. During operation of the bus system 1, the transmit/receive device 12, or more precisely its transmit module 121, converts the transmit signal TXD_TC into corresponding signals CAN_H and CAN_L with voltage levels U for the bus wires 41, 42. The transmit module 121 transmits these signals CAN_H and CAN_L over time t to the bus 40, as shown in FIG. 4. The receive module 122 evaluates signals CAN_H and CAN_L received from the bus 40 and/or their differential signal VDIFF=CAN_H−CAN_L shown in FIG. 5 and forms a receive signal RXD. Ideally, the receive signal RXD is identical to the transmit signal TXD_TC. The receive module 122 outputs the receive signal RXD at the terminal RxD of the device 12.

Despite the signals for the transmit/receive device 12 being here denoted CAN_H and CAN_L, they should not be understood in relation to message 45 as signals CAN-XL_H and CAN-_L which, in the data phase 452, deviate from the conventional signals CAN_H and CAN_L in at least one feature, in particular with regard to the formation of the bus states for the various data states of the signal TXD and/or with regard to the voltage or the physical layer and/or the bit rate.

FIG. 4 shows on the left-hand side that, in the arbitration phase 451, subscriber stations 10, 20, 30 transmit signals CAN_H, CAN_L to the bus 40 which alternately have at least one dominant state 401 or at least one recessive state 402. After arbitration in the arbitration phase 451, one of subscriber stations 10, 20, 30 is established as the winner. Assuming that subscriber station 10 has won the arbitration, the transmit/receive device 12 of subscriber station 10 changes over its physical layer at the end of the arbitration phase 451 from a first operating mode (SLOW) into a second operating mode (FAST_TX) since subscriber station 10 is the transmitter of the message 45 in the data phase 452. In the data phase 452 or in the second operating mode (FAST_TX), the transmit module 121 then, as a function of a transmit signal TXD, generates symbols L0 or L1 in succession and thus serially in the signals CAN_H, CAN_L on the bus 40. The frequency of the signals CAN_H, CAN_L in the data phase 452 can be increased, as shown on the right-hand side in FIG. 4. Accordingly, the symbol duration t_pr0 in the arbitration phase 451 (first communication phase) is greater than the symbol duration t_pr in the data phase 452 (second communication phase). The net data transfer rate is thus increased in the data phase 452 in comparison with the arbitration phase 451. On the other hand, the transmit/receive device 32 of subscriber station 30 changes over its physical layer at the end of the arbitration phase 451 from the first operating mode (SLOW) into a third operating mode (FAST_RX) since in the data phase 452 subscriber station 30 is only a receiver, i.e. not a transmitter, of the frame 450. After the end of the arbitration phase 451, all the transmit/receive devices 12, 32 of subscriber stations 10, 30 change over their operating mode into the first operating mode (SLOW). All the transmit/receive devices 12, 32 thus also change over their physical layer.

The changeover of the operating modes of the transmit/receive devices 12, 32 between the operating mode for the arbitration phase 451 and the operating modes FAST_TX or FAST_RX is controlled via the encoding of the data in the signal TXD on the TXD line between the terminals TxD of the devices 11, 12. As mentioned above, encoding in the PC interface module 15 of the device 11 is performed using the data 17. This function of the PC interface module 15 may also be denoted PWM encoder. Decoding of the data 17 from the signal TXD is performed in the TC interface module 16 of the device 12. This function of the TC interface module 16 may also be denoted PWM decoder.

Figure 5:
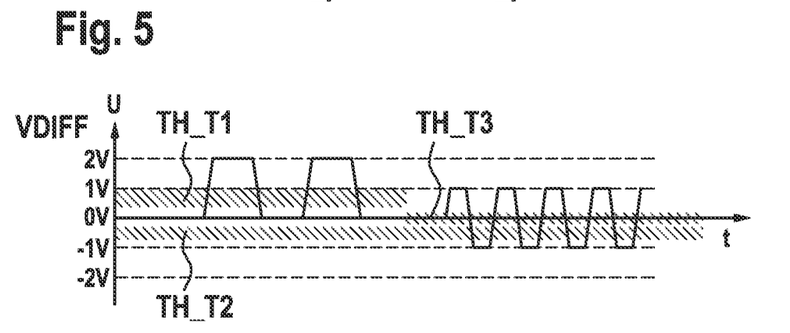

According to FIG. 4 and FIG. 5, a differential signal VDIFF=CAN_H−CAN_L with values of VDIFF=2 V for dominant states 401 and VDIFF=0 V for recessive states 402 is ideally obtained in the arbitration phase 451 on the bus 40.

This is shown on the left-hand side in FIG. 4 and FIG. 5. In contrast, a differential signal VDIFF=CAN_H−CAN_L with states L0, L1 is obtained in the data phase 452 on the bus 40, as shown on the right-hand side in FIG. 4 and FIG. 5.

Figure 6:
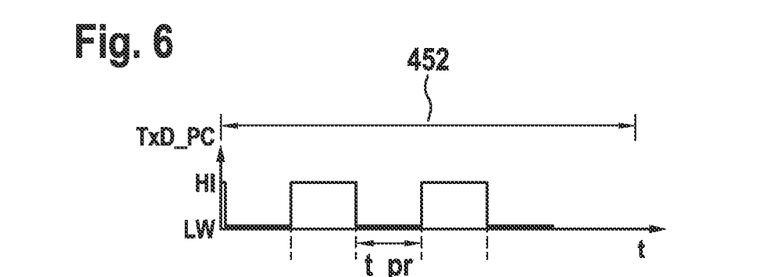
Figure 7:
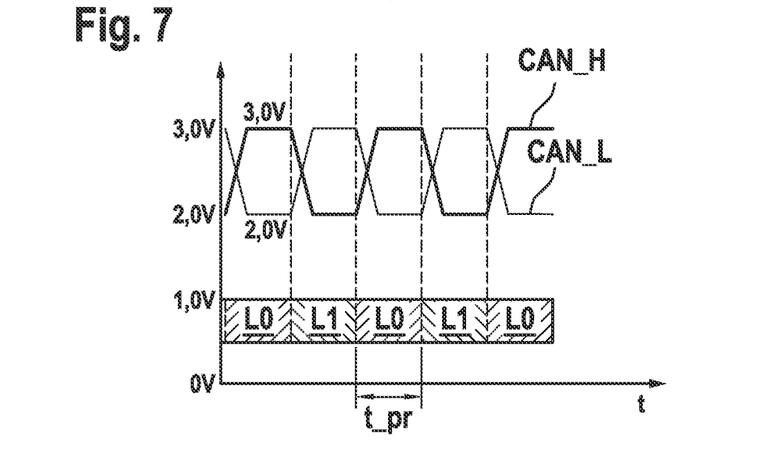

FIG. 6 shows for the data phase 452 an example of the profile over time t of a transmit signal TXD_PC generated by the communication control module 111. The transmit signal TXD_PC has both symbols HI (high) and LW (low). The transmit signal TXD_PC is a digital signal.

State L0 has a value VDIFF=1 V. State L1 has a value VDIFF=−1 V. The receive module 122 can in each case distinguish states 401, 402 and L0, L1 with the receive thresholds which are located in the ranges TH_T1, TH_T2, TH_T3. The receive module 122 in this case uses at least the receive threshold T1 of for example 0.7 V in the arbitration phase 451. The receive module 122 uses the receive threshold T2 of for example −0.35 V for example in the arbitration phase 451, but optionally also in the data phase 452. The receive threshold T3 of for example 0.0 V is used in the data phase 452. On changeover between the first to third operating modes (SLOW, FAST_TX, FAST_RX), which have been described above, the receive module 122 in each case changes over the receive thresholds T1, T2, T3.

With the exception of an idle or standby state, the transmit/receive device 12 may be set up such that the device 12 with its receiver is always listening in normal operation for a transfer of data or messages 45, 46 on the bus 40, specifically irrespective of whether subscriber station 10 is or is not the transmitter of the message 45. The transmit/receive device 12 forms the receive signal RXD from the signals CAN_H and CAN_L received from the bus 40 and forwards it to the communication control device 11, as described above.

FIG. 8 to FIG. 11 show, in the event that subscriber station 10 is the transmitter of frame 450 in the data phase 452, in each case different examples of the encoding which the encoding block 152 carries out over time t for a symbol with a symbol duration t_pr=2*1/2 t_pr in order to convert the signal TXD_PC into the transmit signal TXD. In this case, the subscriber station 10 is switched into the operating mode FAST_TX in the data phase 452.

According to FIG. 8 to FIG. 11, the resultant pulse-width-modulated signal TXD changes during the symbol duration t_pr in each case between the levels high HI and low LW. The symbol duration t_pr begins at a point in time t1, has half elapsed at a point in time t2 and finishes at a point in time t3. At points in time t1, t3, the signal TXD in each case has approximately the value 0.5 HI. A level of approximately 50% of the level HI is thus in each case present at the beginning and end of the symbol duration t_pr.

With CAN XL, a pulse-width modulation (PWM) is used in the second communication phase (data phase) 452 for the symbols L0, L1 in the transmit signal TXD_PC. Standard CiA610-3 in this cases defines minimum and maximum pulse lengths of the symbols L0, L1 in the signal TXD between the communication control device 11 and the transmit/receive device 12 for decoding symbols L0, L1 in the transmit/receive device 12 with a time t_decode<=5 ns, as shown in FIG. 8 to FIG. 11. Standard CiA610-3 additionally defines that in the case of a subscriber station 10, 30, which in ongoing transfer of a message 45 on the bus 40 is not a transmitter but only a receiver of the message 45, the communication control device 11, 31 is exclusively permitted to transmit the symbol L1 in the transmit signal TXD_PC. For changeover of the communication phases 451, 452, 451, it is likewise possible to use pulse-width modulation with the symbols L0, L1 for communication between the communication control device 11, 31 and the transmit/receive device 12, 32 of a subscriber station 10, 30.

Figure 8:
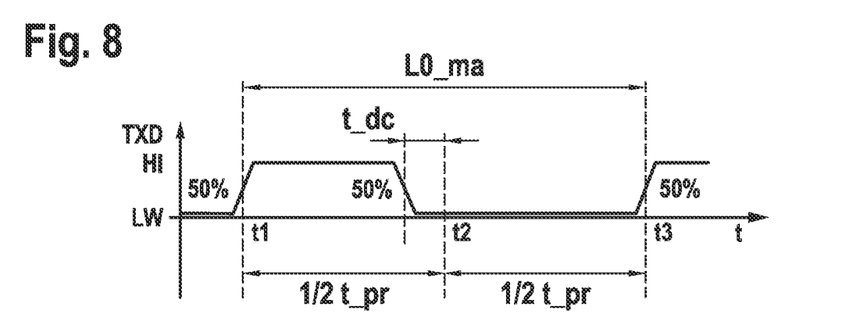
FIG. 8 to FIG. 11 each shows a time plot of encoding of the symbols L0 and L1 for a transmit signal by way of pulse-width modulation (PWM), in the event that the subscriber station is a transmitter of a message transmitted via a bus of the bus system.
Figure 9:
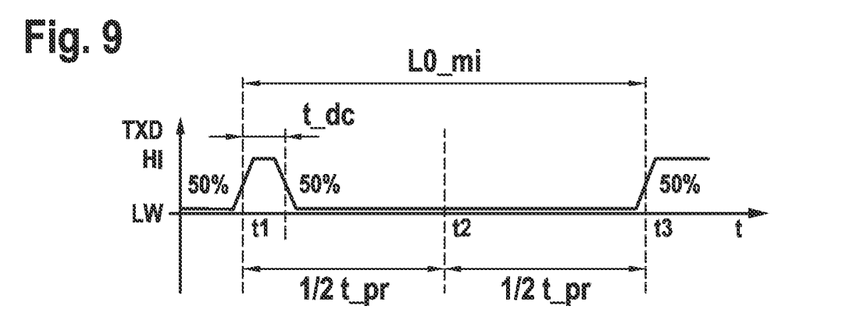

FIG. 8 and FIG. 9 show in each case different examples of the encoding of the state or symbol L0 in the transmit signal TXD. FIG. 8 in this case shows encoding in which the transmit signal TXD has a symbol L0_ma. The symbol L0_ma has the maximum admissible duration for the level high HI and thus the minimum admissible duration for the level low LW. In contrast, FIG. 9 shows encoding in which the transmit signal TXD has a symbol L0_mi. The symbol L0_mi has the minimum admissible duration for the level high HI and thus the maximum admissible duration for the level low LW. In the case of both symbols L0_ma, L0_mi, the duration for the level high HI is <than half the symbol duration t_pr. In addition, both symbols L0_ma, L1_mi begin with the level high HI and end with the level low LW.

Figure 10:
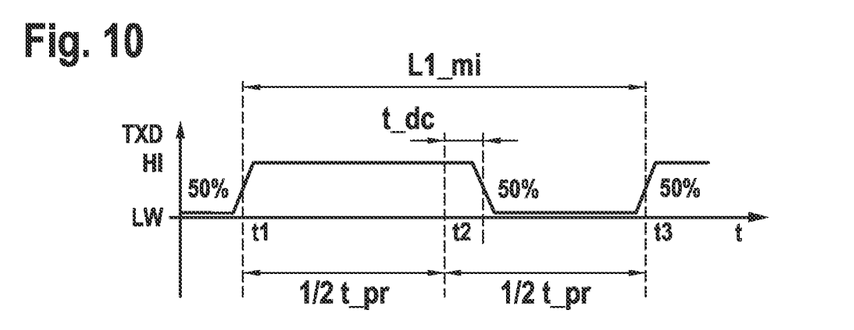
Figure 11:
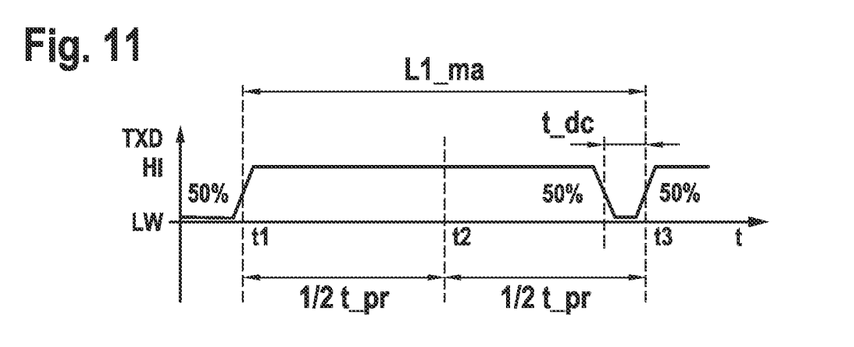

FIG. 10 and FIG. 11 show in each case different examples of the encoding of the state or symbol L1 in the transmit signal TXD. FIG. 10 in this case shows encoding in which the transmit signal TXD has a symbol L1 mi. The symbol L1 mi has the minimum admissible duration for the level high HI and thus the maximum admissible duration for the level low LW. In contrast, FIG. 11 shows encoding in which the transmit signal TXD has a symbol L1 ma. The symbol L1 ma has the maximum admissible duration for the level high HI and thus the minimum admissible duration for the level low LW. In the case of both symbols L1 ma, L1 mi, the duration for the level high HI is greater than half the symbol duration t_pr. In addition, both symbols L1 mi, L1 ma begin with the level high HI and end with the level low LW.

According to FIG. 8 to FIG. 11, each of the symbols L0_ma, L0_mi, L1 mi, L1 ma of the PWM-encoded transmit signal TXD is decoded by the decoding block 162 with decoding time t_dc, or more precisely is acquired with a temporal resolution of t_dc and thus converted into the transmit signal TXD_TC. The decoding time t_dc is set to a predetermined value. For example, t_dc<=5 ns applies, as mentioned above for CAN XL. The decoding time t_dc is displaceable in the symbol duration t_pr. The decoding time t_dc in this case begins with the point in time t1 or the decoding time t_dc ends with the point in time t3. Alternatively, the decoding time t_dc begins or ends with the point in time t2. The decoding time t_dc thus in each case begins or ends at a level of approximately 50% of the level HI. The level which the decoding block 162 identifies in the decoding time t_dc is generated as the level of the transmit signal TXD_TC.

Figure 12:
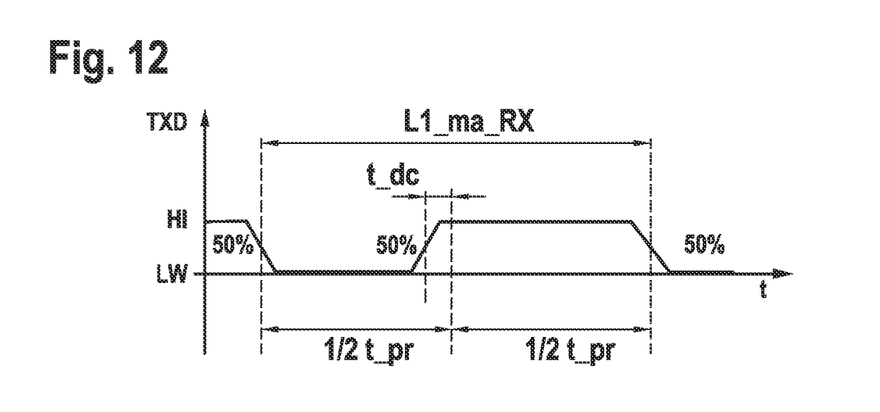
FIG. 12 to FIG. 13 each shows a time plot of encoding of the symbol L1 for a transmit signal by way of pulse-width modulation (PWM), in the event that the subscriber station is a receiver of a message transmitted via the bus of the bus system.
Figure 13:
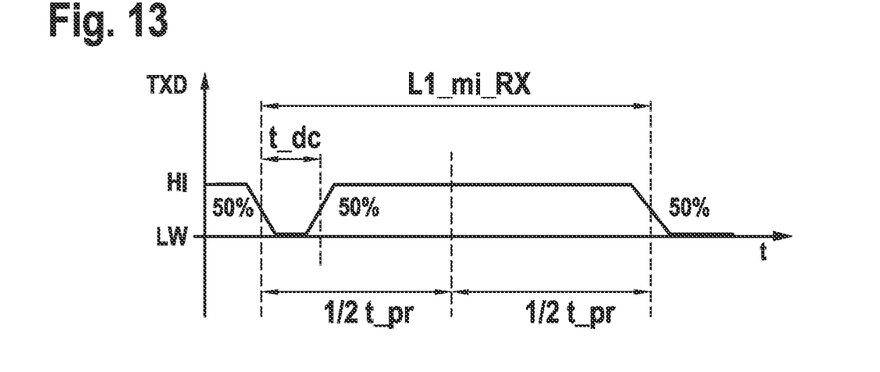

FIG. 12 and FIG. 13 show signal profiles in the event that the subscriber station 10 is only the receiver of the frame 450 in the data phase 452. FIG. 12 and FIG. 13 in each case show different examples of the encoding which the encoding block 152 carries out over time t for a symbol with the symbol duration t_pr=2*1/2 t_pr in order to convert the signal TXD_PC into the transmit signal TXD. In this case, the subscriber station 10 is switched into the operating mode FAST_RX in data phase 452. In the CAN XL operating mode FAST_RX, the communication module 111 is only permitted to generate the transmit signal TXD_PC in such a way that only symbols L1 are transmitted to the bus 40, as already mentioned.

According to FIG. 12 and FIG. 13, the resultant pulse-width-modulated signal TXD changes during the symbol duration t_pr in each case between the levels high HI and low LW, as described above for FIG. 10 and FIG. 11.

FIG. 12 and FIG. 13 in each case show, in contrast to FIG. 10 and FIG. 11, different examples of the encoding of the state L1_ma_RX, L1_mi_RX in the transmit signal TXD.

FIG. 12 in this case shows encoding in which the transmit signal TXD has a symbol L1_ma_RX. The symbol L1_ma_RX has the maximum admissible duration for the level low LW and thus the minimum admissible duration for the level high HI. In contrast, FIG. 13 shows encoding in which the transmit signal TXD has a symbol L1_mi_RX. The symbol L1_mi_RX has the minimum admissible duration for the level low LW and thus the maximum admissible duration for the level high HI. In the case of both symbols L1_ma_RX, L1_mi_RX, the duration for the level high HI is >than half the symbol duration t_pr. In addition, both symbols L1_ma_RX, L1_mi_RX begin with the level low LW and end with the level high HI.

It is configured in the encoding block 152 for the operating mode FAST_TX with which of the symbols of FIG. 8 or FIG. 9 a symbol L0 is to be encoded in the transmit signal TXD_PC and with which of the symbols of FIG. 10 or FIG. 11 a symbol L1 is to be encoded in the transmit signal TXD_PC. This also gives rise to the configuration for the operating mode FAST_RX for generating the symbols of FIG. 12 or FIG. 13. The symbol duration t_pr is additionally defined in the encoding block 152. The configuration of the encoding block 152 also gives rise to the configuration of the decoding block 162, in particular also when the decoding time t_dc begins and/or ends.

Figure 14:
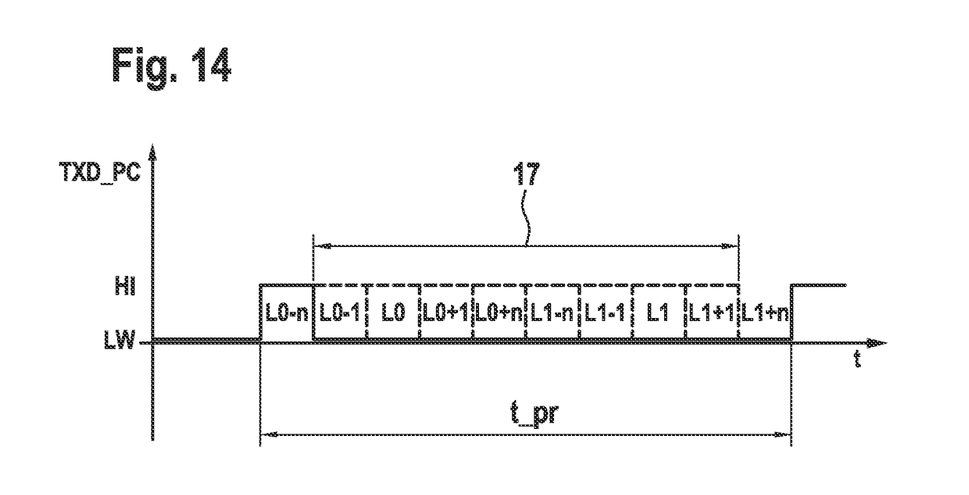
FIG. 14 shows an example of the serial insertion of additional data into the symbols of FIG. 8 to FIG. 13 in the first exemplary embodiment.

In order to encode the additional data 17 into the symbols of FIG. 8 to FIG. 13, the encoding block 152 proceeds as described on the basis of FIG. 14.

According to FIG. 14, the encoding block 152 can modulate in a symbol duration t_pr a level L0 of the transmit signal TXD_PC with 2*n symbols for the pulse-width-modulated transmit signal TXD, wherein n is a natural number greater than or equal to 1. In addition, the encoding block 152 can modulate a level L1 of the transmit signal TXD_PC with 2*n symbols for the pulse-width-modulated transmit signal TXD. In the example of FIG. 14, the symbols L0−n, L0−1, L0, L0+1, L0+n, L1−n, L1−1, L1, L1+1, L1+n are available in a symbol duration t_pr. Of these, a minimum of only the first and last symbols L0−n, L1+n are necessary for identifying the level L0 or L1 which is to be transferred by the transmit signal TXD_PC into the pulse-width-modulated transmit signal TXD. The other symbols can be used for encoding the data 17.

FIG. 14 shows an example configuration of the encoding block 152 in the operating mode FAST_TX, in which a configuration according to FIG. 9 is selected for a symbol L0 and a configuration according to FIG. 11 for a symbol L1. The data 17 can therefore be inserted between the first and last symbol L0−n, L1+n. Very generally, the encoding block 152 can insert the additional data 17 into the encoded transmit signal TXD as at least one of the symbols L0−n, L1+n of the encoded transmit signal TXD serially with the information of the symbol L0, L1 of the transmit signal TXD_PC.

On decoding, the decoding block 162 can then read back out from first and last symbols L0−n, L1+n whether the symbol L0 or L1 should be introduced into the signal TXD_TC. In addition, on decoding the decoding block 162 can extract the data 17 and for example save them in the memory block 161. A similar situation applies to the configuration of the encoding block 152 in the operating mode FAST_RX.

If, for example, the data 17 contain the operating mode into which the transmit/receive device 12 is to be switched, the data 17 are used for switching the operating mode of the transmit/receive device 12.

As a result, the data rate of the transmit signal TXD may be increased for at least one symbol of the signal of (L0/L1)=1/t_pr to L0 modulated with 2*n symbols, L1 modulated with 2*n symbols=2*n/t_pr.

The value n for configuring the encoding block 152 is selectable for example as a function of the bit rate which is used. In CAN-XL with 5 Mbit/s in operating modes FAST-TX, FAST-RX, the symbol duration amounts to t_pr=200 ns according to standard CiA610-3. In CAN-XL with 20 Mbit/s in operating modes FAST-TX, FAST-RX, the symbol duration amounts to t_pr=50 ns according to standard CiA610-3. As already mentioned above, the defined accuracy of PWM decoding is defined, independently of bit rate, at a maximum of 5 ns. n can thus be selected low at higher bit rates and high at low bit rates.

According to one specific variant embodiment, n=1 applies. All the bit rates which are specified in standard CiA610-3 can be achieved therewith.

The data 17 can be inserted only in some of the possible symbols between the first and last symbols L0−n, L1+n. The data 17 are inserted in at least one symbol between the first and last symbols L0−n, L1+n. In particular, the data 17 can only be inserted into the part of the possible symbols for L0 modulated with 2*n symbols or only into the part of the possible symbols for L1 modulated with 2*n symbols.

If required, the data 17 can be distributed between more than one symbol duration t_pr. This is advantageous if a relatively large volume of data 17 is to be transferred and/or the bit rate is rather high.

Modulation by the encoding block 152 may proceed in each pulse width modulation period (PWM period) or only as required, in particular only in at least one pulse width modulation period (PWM period).

The method can be applied for transmitting subscriber stations 10, 30 (Fast-TX subscriber stations 10, 30) and/or for receiving subscriber stations 10, 30 (Fast-RX subscriber stations 10, 30).

The described structure of the subscriber stations 10, 30 thus provides a robust and simple possible way to transfer additional data 17 between the communication control device 11 and the transmit/receive device 12 without additional costly terminals. Data rates are also not reduced in this case but, on transfer of data during the data phase 452 of a frame 450, are instead even raised in comparison with conventional techniques.

According to one modification of the first exemplary embodiment, it is possible for the encoding block 152 to carry out, instead of pulse-width modulation, another encoding of the transmit signal TXD_PC. Any encoding which, in the encoded transmit signal TXD, serially inserts the information of the symbols L0, L1 of the transmit signal TXD_PC within the previous symbol duration t_pr is suitable for this purpose.

According to a second exemplary embodiment, the encoding block 152 is configured to carry out configuration of the transmit/receive device 12 with the data 17. In this way, configuration of the transmit/receive device 12 may proceed so to speak in concealed manner in the TXD data stream.

For example, in the present exemplary embodiment, the encoding block 152 is configured in a CAN XL frame 450 to transmit the last two 0 bits (FPC1, FCP0) with the symbol L0−1 instead of with a symbol L0. The transmit/receive device 12 then identifies, in particular by means of the decoding block 162, that the transmit/receive device 12 is to enter the standby state shortly after being switched back from the operating mode FAST-TX into the operating mode SLOW of the arbitration phase 451.

This configuration of the subscriber station 10 may lead to economies on transmit/receive device 12 (transceiver) terminals. For example, the separately present terminal STB (standby terminal) can be omitted. This is highly advantageous in the case of a separate transmit/receive device 12 with eight terminals (8 pin standalone transceiver), since separate grounds for the transmit module 121 (transmitter) and the terminal RxD can very straightforwardly be enabled in this way. Emissions limit values can consequently be observed at the required CAN-XL bit rates.

According to a third exemplary embodiment, the encoding block 152 is configured to transmit at least one request to the transmit/receive device 12 with the data 17.

For example, as a result of the request in the data 17, the transmit/receive device 12 and/or the system ASIC 14 can acquire at least one physical quantity. The associated physical data may in particular be provided to the encoding block 152 and/or the communication control module 111 and/or the device 11. The physical data may for example be transmitted to the encoding block 152 via a separate message. Such physical data for the data 17 may for example be data relating to the corrosion of electrical connection contacts on the bus lines 41, 42. Depending on corrosion, it may be necessary to take steps on the device 11 to modify the differential voltage VDIFF of the transmit signal TxD. The quality of data transfer in the bus system 1 can in this way be ensured (quality of service (QoS)).

According to a fourth exemplary embodiment, the encoding block 152 is configured to communicate to the transmit/receive device 12 with the data 17 the differential voltage VDIFF with which the transmit/receive device 12 is to operate. For example, the symbol L0 may mean that, in the operating modes FAST-TX, FAST-RX, the transmit/receive device 12 is to operate with the differential voltages VDIFF of FIG. 5. The symbol L0-1 may mean that the 0 level is to be transmitted with a smaller differential voltage VDIFF than in the example of FIG. 5. The same applies for the symbol L1. The symbol L1+1 may accordingly mean that the 1 level is to be transmitted with a larger differential voltage VDIFF than in the example of FIG. 5.

According to a fifth exemplary embodiment, the encoding block 152 is configured to communicate or initiate or carry out programming/flashing of devices with the data 17. Each electronic component which contains the transmit/receive device 12 (CAN-XL transceiver module), including the terminal TxD, can be programmed via the interface modules 15, 16. For example, the data 17 can specify the following configuration, namely a bit rate configuration for 10 Mbit/s, whereby t_pr_TXD=100 ns applies. In addition, a conservative/robust configuration n=2 may be specified, resulting in a data rate of the transmit signal TxD as 2*n/tpr=4/100 ns=25 Mbaud.

According to a sixth exemplary embodiment, the encoding block 152 is configured to initiate or carry out triggering for selective wake-up bus signals with the data 17. The encoding block 152 can thus trigger the transmit/receive device 12 to transmit a specific wake-up pattern to the bus 40, in order for example to reawaken just one individual subscriber station 10, 20, 30 of the bus system 1 after said subscriber has not been required for a certain period and has therefore been put to sleep. For example, selective wake-up is possible in CAN-XL by means of a pulse with a voltage level of −1 V.

All the above-described configurations of the devices 11, 12, 31, 32, of the modules 15, 16, 35, 36, of the subscriber stations 10, 20, 30, of the bus system 1 and of the method carried out therein may be used individually or in any possible combinations. In particular, all the features of above-described exemplary embodiments and/or the modifications thereof may be combined as desired. In particular, the following modifications are additionally or alternatively possible.

Although the present invention has been described above taking the CAN bus system by way of example, the present invention can be used in any communication network and/or communication method in which two different communication phases are used in which there are differences in the bus states which are generated for the different communication phases. In particular, the above-described principle of the present invention is usable in interfaces which require for different communication phases a changeover signal from a protocol controller or module 111 and/or in this case require data exchange between devices 11, 12.

The above-described bus system 1 according to the exemplary embodiments is described on the basis of a bus system based on the CAN protocol. The bus system 1 according to the exemplary embodiments may however alternatively be another kind of communication network in which data are serially transferable at two different bit rates. It is advantageous, but not a necessary prerequisite, that exclusive, collision-free access of a subscriber station 10, 20, 30 to a common channel is ensured in the bus system 1 at least for specific time intervals.

At least one form of data 17, which is described in the preceding exemplary embodiments, can be integrated in a frame 45 between the devices 11, 12 or 31, 32. Any desired combination of the data 17 which are described in the preceding exemplary embodiments is thus possible. In addition, any desired arrangement of the data 17 in the data phase 452 of a message 45 or of a frame 450 is possible.

Any desired number and arrangement of the subscriber stations 10, 20, 30 in the bus system 1 of the exemplary embodiments is possible. In particular, subscriber station 20 can be omitted from the bus system 1. It is possible for one or more of subscriber stations 10 or 30 to be present in the bus system 1. It is possible for all the subscriber stations in the bus system 1 to be identically configured, i.e. for only subscriber station 10 or only subscriber station 30 to be present.

What is claimed is:

1. A communication control device for a subscriber station of a serial bus system that includes a plurality of subscriber stations, the subscriber station being one of the plurality of subscriber stations, comprising:

a communication control module configured to generate a transmit signal for a transceiver of the subscriber station that communicates with at least one other subscriber station of the plurality of subscriber stations of the bus system, wherein the bus system is configured to use at least one first communication phase and one second communication phase for exchanging messages between the plurality of subscriber stations of the bus system, wherein the transmit signal includes data of one of the messages to be transmitted by the transceiver; and an interface module configured to:

encode the transmit signal in at least one part of the second communication phase of the one of the messages into an encoded transmit signal that includes at least one symbol; and insert additional data, that controls a behavior of the transceiver, into the at least one symbol of the encoded transmit signal, such that the additional data is interleaved serially with the data of the at least one symbol of the one of the messages of the transmit signal; and wherein a symbol duration of the transmit signal and of the encoded transmit signal is identical.

2. The communication control device as recited in claim 1, wherein the interface module is configured to carry out pulse-width modulation for encoding the transmit signal in at least one part of the second communication phase of the message.

3. A communication control device for a subscriber station of a serial bus system, the communication control device comprising:
- a communication control module configured to generate a transmit signal for controlling communication of the subscriber station with at least one other subscriber station of the bus system, wherein the bus system is configured to use at least one first communication phase and one second communication phase for exchanging messages between subscriber stations of the bus system; and
- an interface module configured to encode the transmit signal in at least one part of the second communication phase of a message into an encoded transmit signal, and to insert additional data into at least one symbol of the encoded transmit signal;
- wherein:
  - the interface module is configured to insert the additional data into the encoded transmit signal as at least one symbol of the encoded transmit signal serially with information of the symbol of the transmit signal;
  - a symbol duration of the transmit signal and of the encoded transmit signal is identical; and
  - the interface module is configured to subdivide the symbol duration of the transmit signal for the encoded transmit signal into n symbols for a first symbol of the transmit signal and into n symbols for a second symbol of the transmit signal, wherein n is a natural number greater than or equal to 1.

4. The communication control device as recited in claim 3, wherein the interface module is configured to insert the information of the symbol of the transmit signal into the first or last symbol of the 2*n symbols of the symbol duration of the encoded transmit signal.

5. The communication control device as recited in claim 3, wherein the interface module is configured to insert the additional data between the first and last symbols of the 2*n symbols of the symbol duration of the encoded transmit signal.

6. A communication control device for a subscriber station of a serial bus system, the communication control device comprising:
- a communication control module configured to generate a transmit signal for controlling communication of the subscriber station with at least one other subscriber station of the bus system, wherein the bus system is configured to use at least one first communication phase and one second communication phase for exchanging messages between subscriber stations of the bus system; and
- an interface module configured to encode the transmit signal in at least one part of the second communication phase of a message into an encoded transmit signal, and to insert additional data into at least one symbol of the encoded transmit signal;
- wherein:
  - the interface module is configured to insert the additional data into the encoded transmit signal as at least one symbol of the encoded transmit signal serially with information of the symbol of the transmit signal;
  - a symbol duration of the transmit signal and of the encoded transmit signal is identical; and
  - the communication control module is configured to generate the transmit signal in the first communication phase of the message with symbols with a first bit time which is at least a factor of 10 greater than a second bit time of symbols which the communication control module generates in the transmit signal in the second communication phase of the message.

7. A transmit/receive device of a subscriber station of a serial bus system that includes a plurality of subscriber stations, the subscriber station being one of the plurality of subscriber stations, wherein the bus system is configured to use a first communication phase and a second communication phase for exchanging messages between the plurality of subscriber stations of the bus system, the transmit/receive device comprising:
- a transmit module configured to transmit, to another one of the subscriber stations and via a bus of the bus system, data of one of the messages, the data having been encoded, from a transmit signal, with at least one symbol in an encoded transmit signal; and
- an interface module configured to decode the encoded transmit signal in at least one part of the second communication phase of the one of the messages to extract additional data from the at least one symbol of the encoded transmit signal;
- wherein:
  - the additional data had been inserted into the at least one symbol of the encoded transmit signal to be interleaved serially with the data of the at least one symbol of the one of the messages;
  - a behavior of the transmit module is controlled according to the extracted additional data; and
  - a symbol duration of the transmit signal and of the encoded transmit signal is identical.

8. The transmit/receive device as recited in claim 7, wherein the interface module is configured to carry out decoding of pulse-width modulation of the transmit signal in the at least one part of the second communication phase of the message.

9. The transmit/receive device as recited in claim 7, wherein the transmit module is configured to transmit the data of the one of the messages as a differential signal to the bus.

10. The transmit/receive device as recited in claim 7, wherein the transmit module is configured to generate a transmit signal in the first communication phase of the message and transmit it to the bus with a different physical layer than in the second communication phase of the message.

11. The device as recited in claim 7, wherein the additional data include at least one form of data of the following data: (i) data for signaling to the transmit/receive device an operating mode into which the transmit/receive device has to switch for a following communication phase, and/or (ii) data for configuration of the transmit/receive device, and/or (iii) data with a request to the transmit/receive device, and/or (iv) data for signaling to the transmit/receive device a differential voltage with which the transmit/receive device is to operate for the bus, and/or (v) data for programming or flashing devices, and/or (vi) data with a trigger for a predetermined wake-up pattern for a predetermined subscriber station of the bus system.

12. The device as recited in claim 7, wherein the first communication phase of the message is provided in order to negotiate which of the subscriber stations of the bus system will receive at least temporarily exclusive, collision-free access to the bus in a following second communication phase.

13. A transmit/receive device for a subscriber station of a serial bus system, the transmit/receive device comprising:
- a transmit module configured to transmit a transmit signal on a bus of the bus system, wherein the bus system is configured to use at least one first communication phase and one second communication phase for exchanging messages between subscriber stations of the bus system; and
- an interface module configured to decode the transmit signal in at least one part of the second communication phase of a message into a decoded transmit signal, and to extract additional data from at least one symbol of the encoded transmit signal;

wherein:
- the interface module is configured to extract the additional data from at least one symbol of the encoded transmit signal, which data have been inserted into the encoded transmit signal serially with information of the symbol of the transmit signal;
- a symbol duration of the transmit signal and of the decoded transmit signal is identical;
- the interface module is configured to subdivide the symbol duration of the encoded transmit signal into n symbols for a first symbol of the encoded transmit signal and into n symbols for a second symbol of the encoded transmit signal;
- n is a natural number greater than or equal to 1.

14. The transmit/receive device as recited in claim 13, wherein the interface module is configured to extract the information of the symbol of the transmit signal from the first or last symbol of the 2*n symbols of the symbol duration of the encoded transmit signal.

15. The transmit/receive device as recited in claim 13, wherein the interface module is configured to extract the additional data between the first and last symbols of the 2*n symbols of the symbol duration of the encoded transmit signal.

16. A bus system, comprising:
- a bus; and
- a plurality of subscriber stations which are connected together via the bus, wherein the bus system is configured to use a first communication phase and a second communication phase for exchanging messages between the plurality of subscriber stations of the bus system and at least one of the plurality of subscriber stations has a transmit/receive device including:
  - a transmit module configured to transmit, to another one of the subscriber stations and via the bus of the bus system, data of one of the messages, the data having been encoded, from a transmit signal, with at least one symbol in an encoded transmit signal; and
  - an interface module configured to decode the encoded transmit signal in at least one part of the second communication phase of the one of the messages to extract additional data from the at least one symbol of the encoded transmit signal;

wherein:
- the additional data had been inserted into the at least one symbol of the encoded transmit signal to be interleaved serially with the data of the at least one symbol of the one of the messages;
- a behavior of the transmit module is controlled according to the extracted additional data; and
- a symbol duration of the transmit signal and of the encoded transmit signal is identical.

17. A method for a subscriber station of a serial bus system that includes a plurality of subscriber stations, the subscriber station being one of the plurality of subscriber stations, wherein the bus system is configured to use at least one first communication phase and one second communication phase for exchanging messages between the plurality of subscriber stations of the bus system, and wherein the method comprises the following steps:
- generating, with a communication control module, a transmit signal for a transceiver of the subscriber station, wherein the transmit signal includes data of one of the messages to be transmitted by the transceiver;
- encoding, using an interface module, the transmit signal in at least one part of the second communication phase of the one of the messages into an encoded transmit signal that includes at least one symbol; and
- inserting, with the interface module, additional data, that controls a behavior of the transceiver, into the at least one symbol of the encoded transmit signal, such that the additional data is interleaved serially with the data of the at least one symbol of the one of the messages of the transmit signal, wherein a symbol duration of the transmit signal and of the encoded transmit signal is identical.

* * * * *